Nov. 9, 1965 J. STARREVELD ETAL 3,217,263

FREQUENCY DEMODULATION CIRCUIT ARRANGEMENT

Filed Dec. 16, 1960

INVENTOR
JAAP STARREVELD &
WIM ZADEL

BY Frank R. Trifari
AGENT 3,217,263

FREQUENCY DEMODULATION CIRCUIT ARRANGEMENT

Jaap Starreveld and Wim Zadel, Hilversum, Netherlands, assignors to North American Philips Company, Inc., New York, N.Y., a corporation of Delaware Filed Dec. 16, 1960, Ser. No. 76,365
Claims priority, application Germany, Jan. 30, 1960, N 17,819
13 Claims. (Cl. 329—137)

This invention relates to a circuit arrangement for frequency demodulation of an electric signal by means of a single resonant circuit. In a known arrangement of this kind the resonant circuit is connected via the emitter-base circuit of a first transistor and the voltage across the resonant circuit is fed to a second transistor. In this case the transistors operate as electronic switches, which allow current to pass in accordance with the relative phase difference between the voltage across the resonant circuit and the current passing through the latter. The total current of the two transistors is then a measure for the instantaneous frequency of the signal to be demodulated.

The invention relates to a frequency demodulation arrangement based on the Foster and Seeley push-pull principle. This arrangement is also suitable for the use of transistors, which are then connected as detectors, preferably as current detectors. The invention has for its object to combine the favorable properties of such a push-pull demodulator, i.e. low distortion and lower sensitivity to unwanted amplitude demodulation than that of the aforesaid known arrangement, with the use of a single resonant circuit which is less in need of readjustment (trimming).

The invention is characterized in that the electric signal current is fed to a resonant circuit consisting of the closed series combination of at least one inductor, a capacitor and a resistor, in which circuit this signal current produces a current increased by the quality factor of the resonant circuit, which current produces a voltage across the resistor which, at the central frequency of the signal is 90° phase shifted with respect to the first-mentioned current, the said two currents being fed to a push-pull detector having two rectifiers and a push-pull output circuit.

The invention will be described more fully with reference to the drawing.

Figure 1:
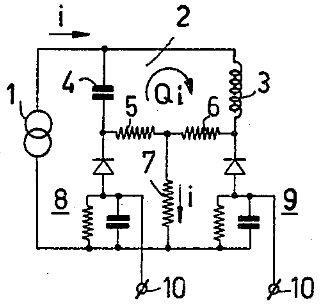
FIG. 1 shows the principle diagram of the invention.

In the circuit arrangement shown in FIG. 1 frequency modulation signals of a high-ohmic signal source 1 are fed to a resonant circuit 2, which consists of the closed series combination of an inductor 3, a capacitor 4 and a resistor consisting of two portions 5 and 6. The frequency modulation current $i$ produces across this resonant circuit 2 a current $Qi$, of which the phase is shifted by 90° with respect to the current $i$ at the mid-frequency of the frequency/modulation signals. The current $i$ passes through a further resistor 7 and the voltages between the lower terminal of the resistor 7 and the left-hand or the right-hand terminal respectively of the resistors 5, 6 are demodulated by means of push-pull demodulators 8, 9, so that the demodulated oscillation can be obtained from the output terminals 10.

Figure 2:
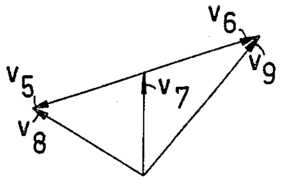
FIG. 2 shows a vector diagram to explain the arrangement shown in FIG. 1.

FIG. 2 shows the voltage vectors $V_7$, $V_5$ and $V_6$ of the voltages produced across the resistors 7, 5 and 6 respectively at a value of the instantaneous frequency of the frequency modulation signal deviating from the mid-frequency. From this figure it is evident that in this case the same behavior is found as in the known Foster-Seeley detector. The voltages corresponding to the vectors $V_8$ and $V_9$ attain the rectifiers 8 and 9 respectively and the output voltage at the terminals 10 is substantially linear with the input frequency and at the mid-frequency it is substantially independent of amplitude fluctuations, if any, of the input oscillations.

Figure 3:
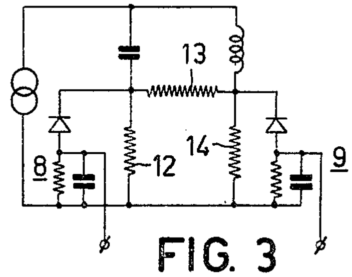
FIG. 3 shows a variant of the arrangement of FIG. 1.

In the arrangement shown in FIG. 3 the T-member 5, 6, 7 is replaced by a $\pi$-circuit 12, 13, 14. This circuit matches better the practical requirements, since the resistors 12 and 14 may be replaced wholly or partly by the loss resistances of the detectors 8 and 9 respectively.

Figure 4:
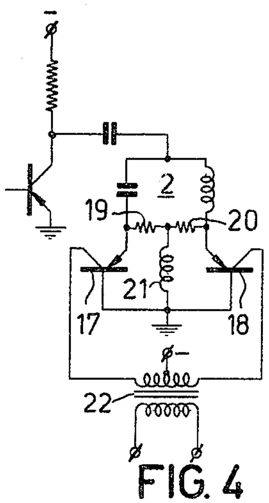
FIG. 4 shows the use of detector transistors in the arrangement shown in FIG. 3.

FIG. 4 shows one embodiment of this variant, in which the diode rectifiers of the detectors 8 and 9 of FIG. 3 are replaced by the emitter-base circuits of the transistors 17 and 18 respectively. The transistors 17 and 18 operate as current detectors owing to the co-operation with the resistors 19 and 20 respectively and the choke 21. The resistors 19 and 20 constitute together the resistor 13 of FIG. 3. The reactance of choke 21 is preferably large at the frequency of the signal oscillations to be demodulated with respect to the parallel-connected impedance; its value is negligible at the frequency of the demodulated oscillations. Since, as is evident from FIG. 2, the resistors 19 and 20 corresponding with the resistor 13 of FIG. 3 and with the resistors 5 and 6 respectively of FIG. 1 are to be chosen comparatively small—for example having a value of 20 to 30 ohms—the corresponding condition for the time constant of the choke 21 and the resistors 19 and 20 in series with the internal input resistances of the transistors 17 and 18 respectively can be readily fulfilled. Moreover, owing to the low value of the resistors 19 and 20 the choke 21 has only a very slight influence on the resonance frequency of the circuit 2. The demodulated output oscillations are obtained from the output transmission member 22. This transmission member 22 may, of course, be replaced by a resistor and, if desired, it may be shunted by a capacitor having a low impedance value for the frequency of the signal oscillations to be demodulated.

For certain uses the arrangements so far described have the disadvantage that the output signal of input signal oscillations having a frequency quite remote from the resonance frequency of the circuit 2, for example, of the second harmonic of the signal oscillations, is not equal to zero. This means that the demodulation circuit is also sensitive to any distortion of the input signal oscillations, which may, for example, be due to the preceding limiting stage. The arrangement of FIG. 5 provides an improvement in this respect.

The resonant circuit 2 of this arrangement consists of the inductor 3, the two capacitors 25 and 26, replacing the single capacitor 4 of FIG. 1, and the resistor 13 of FIG. 3. By correct proportioning of the capacitors 25 and 26 it may be ensured that, for example, if the source 1 supplies a pulsatory signal, the harmonics of this signal current fed to the detector 8 by the capacitor 25 are approximately equal to the harmonics of the signal current fed to the detector 9 by the series combination of the inductor 3 and the capacitor 26.

Figure 5:
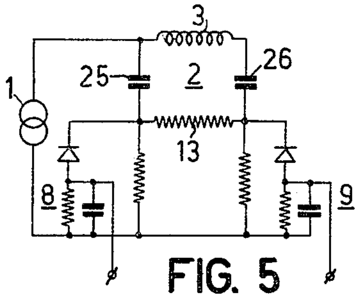
FIG. 5 shows a variant of the arrangement of FIG. 3.
Figure 6:
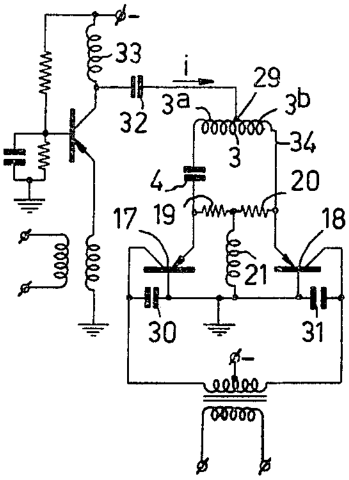
FIG. 6 shows a preferred variant of the arrangement shown in FIG. 4.

However, since the capacitors 25 and 26 exhibit an increasing impedance for the higher harmonics of the signal oscillations, higher requirements are to be met in the arrangement of FIG. 5 by the compensation of the harmonics than in the arrangement of FIG. 6 in which the input signal current $i$ is fed to a tapping 29, for example a central tapping, of the inductor 3. The current $i$ is then divided among the two portions of the inductor 3 and since the impedances of these portions increase with the higher harmonics of the signal oscillations, a materially improved compensation of the sensitivity to these higher harmonics as compared with the arrangement of FIG. 5 can be obtained. The circuit elements 17 to 21 have in this case the same functions as in the arrangement of FIG. 4.

The arrangement of FIG. 6 provides, moreover, the possibility of suppressing completely the sensitivity to a given harmonic. If, for example, the output voltage for the second harmonic of the signal oscillation is to be zero, the tapping 29 is to be chosen so that the portions of the inductor 3$a$ and 3$b$ have a ratio of 5:3. These portions of the inductor 3$a$ and 3$b$ need not be fixedly coupled with each other, but for practical reasons use is preferably made of the solution shown of two equal self-inductances, particularly of a centrally tapped coil, of which the inductor portions are mounted on the same support and are fixedly coupled with each other.

In a practical embodiment the circuit elements had the following values:

Transistors:
- 17=OC170
- 18=OC170

Resistors:
- 19=39Ω
- 20=39Ω

Capacitors:
- 4=470 pf.
- 30=20,000 pf.
- 31=20,000 pf.
- 32=10,000 pf.

Inductors:
- 3=300/μh. with central tapping
- 21=10 mh.
- 33=10 mh.
- (with internal input resistance from 500 to 200 ohms (decreasing at an increasing input signal)).

Mid-frequency=455 kc./s., quality factor of circuit 2=40, output current =2 ma.

Figure 7:
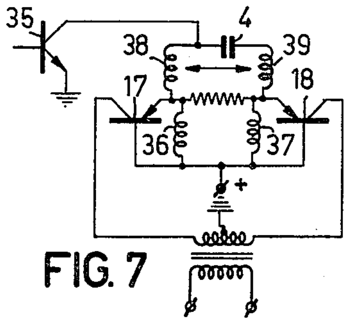
FIG. 7 shows a further variant of the arrangement of FIG. 4.

The separation capacitor 32 may, if desired, be included in the conductor 34 between the inductor 3 and the transistor 18. In the arrangement shown in FIG. 7 it is economized by using a bias transistor 35 of a conductivity type opposite that of the detector transistors 17 and 18. The arrangement furthermore has two chokes 36 and 37, which are connected in parallel with the detector transistors 17 and 18. The inductor portions 3$a$ and 3$b$ of FIG. 6 are replaced by separate, coupled inductors 38 and 39. In principle an opposite conductivity type may be chosen for the detector transistors 17 and 18. The collectors thereof are, however, to be connected in this case to supply voltages of opposite polarities or other, more complicated measures are to be taken.

What is claimed is:

1. A circuit for frequency demodulation of electric signals comprising a source of said signals having first and second terminals, a loop circuit resonant at the center frequency of said signals and having first, second and third arms, said arms being capacitive, inductive and resistive respectively at said center frequency, means connecting the junction of said first and second arms to said first terminal, first detector means connected between said second terminal and one end of said third arm, and second detector means connected between said second terminal and the other end of said third arm.

2. The circuit of claim 1 comprising means combining the outputs of said detector means in push-pull to provide a demodulated output signal.

3. A circuit for frequency demodulation of electric signals comprising a source of said signals having first and second terminals, a loop circuit resonant at the center frequency of said signals and having first, second and third arms, said arms being capacitive, inductive and resistive respectively at said center frequency, means connecting the junction of said first and second arms to said first terminals, said third arm having a center tap, an impedance connecting said tap to said second terminal and first and second detector means connected between said second terminal and opposite ends of said third arm.

4. The circuit of claim 3 in which said impedance is a resistor, and said detector means comprise serially connected rectifier means and impedance means, said rectifier means having the same polarity with respect to said source, and output terminals connected to the junctions of said rectifier means and the respective impedance means.

5. The circuit of claim 3 in which said impedance is an inductor having a high impedance at the frequency of said signals, said first and second detector means comprise first and second transistors respectively, means connecting the bases of said transistors to said second terminal, means connecting the emitters of said transistors to opposite ends of said third arm, and push-pull output circuit means connected to the collectors of said transistors.

6. A circuit for frequency demodulation of electric signals comprising a source of said signals having first and second terminals, a loop circuit resonant at the center frequency of said signals and having first, second and third arms, said arms being capacitive, inductive and resistive respectively at said center frequency, means connecting the junction of said first and second arms to said first terminal, a first impedance connected between said second terminal and one end of said third arm, a second impedance connected between said second terminal and the other end of said third arm, and first and second detector means connected in parallel with said first and second impedances respectively.

7. The circuit of claim 6 in which said impedances are resistors, and said detector means each comprise the series connection of rectifier means and impedance means, said rectifier means having the same polarity with respect to said source, and output terminals connected to the junctions of said rectifier means and impedance means.

8. The circuit of claim 6 in which said impedances are inductors having high impedance at the frequency of said signals, and said first and second detector means comprise first and second transistors respectively, means connecting the bases of said transistors to said second terminal, means connecting the emitters of said transistors to opposite ends of said third arm, and push-pull output circuit means connected to the collectors of said transistors.

9. A circuit for frequency demodulation of electric signals comprising a source of said signals having first and second terminals, a loop circuit resonant at the center frequency of said signals and having first, second and third arms, said arms being capacitive, inductive and resistive respectively at said center frequency, first and second detector means having at least a pair of terminals and having unidirectional current flow characteristics between said pair of terminals, means connecting the pairs of terminals of said first detector means between said second terminal and one end of said third arm, means connecting the pairs of terminals of said second detector means between said second terminal and the other end of said third arm, and output circuit means connected to said detector means.

10. The circuit of claim 9 in which at least one of said first and second arms comprises first and second reactance means of opposite type, whereby the signals from said source applied to said detector means are substantially equal for at least one frequency remote from said center frequency.

11. A circuit for frequency demodulation of electric signals comprising a source of said signals having first and second terminals, first circuit means inductive at the center frequency of said signals having one end connected to said first terminal, second circuit means capacitive at said center frequency having one end connected to said first terminals, an electrical network having third, fourth and fifth terminals, means connecting the other ends of said first and second circuit means to said third and fourth terminals respectively, means connecting said fifth terminal to said second terminal, said electrical network comprising resistance means connected between said third and fourth terminals whereby said first and second circuit means and resistance means comprise a loop circuit resonant at said center frequency, said network further comprising first and second unidirectional current devices, means connecting said first and second devices between said fifth terminal and said third and fourth terminals respectively, direct current conductive means connected between said fifth terminal and said resistance means, and output circuit means connected to said first and second devices.

12. A circuit for frequency demodulation of electric signals comprising a source of said signals having first and second terminals, a loop circuit resonant at the center frequency of said signals and having first, second and third arms, said arms being capacitive, inductive and resistive respectively at said center frequency, means connecting the junction of said first and second arms to said first terminal, and means connected between said second terminal and said third arm for deriving combined in phase and quadrature components of said signals, said last-mentioned means comprising first detector means connected between said second terminal and one end of said third arm, and second detector means connected between said second terminal and the other end of said third arm.

13. A circuit for frequency demodulation of electric signals comprising a source of said signals having first and second terminals, a loop circuit resonant at the center frequency of said signals and having first, second and third arms, said arms being capacitive, inductive and resistive respectively at said center frequency, means connecting the junction of said first and second arms to said first terminal, direct current conductive impedance means connected between said second terminal and said third arm, first detector means connected between said second terminal and one end of said third arm, and second detector means connected between said second terminal and the other end of said third arm.

References Cited by the Examiner

UNITED STATES PATENTS

| | | | |
|---|---|---|---|
| 2,248,229 | 7/41 | Green | 329—137 |
| 2,411,605 | 11/46 | Webb | 329—138 X |
| 2,525,780 | 10/50 | Dennis | 329—137 X |
| 2,849,607 | 8/58 | Leister | 329—134 X |
| 2,901,612 | 8/59 | Dwork et al. | 329—103 |
| 2,915,636 | 12/59 | Cluwen | 329—103 |
| 3,046,415 | 7/62 | Winslow | 307—88.5 |

ROY LAKE, *Primary Examiner.*

L. MILLER ANDRUS, ALFRED L. BRODY, *Examiners.*